United States Patent
Ogata

(10) Patent No.: US 7,694,510 B2
(45) Date of Patent: Apr. 13, 2010

(54) MOTOR CONTROL APPARATUS FOR A HYBRID VEHICLE

(75) Inventor: Makoto Ogata, Tokyo (JP)

(73) Assignee: Mitsubishi Fuso Truck and Bus Corporation, Tokyo (JP)

(*) Notice: Subject to any disclaimer, the term of this patent is extended or adjusted under 35 U.S.C. 154(b) by 0 days.

(21) Appl. No.: 11/392,819

(22) Filed: Mar. 30, 2006

(65) Prior Publication Data
US 2006/0218903 A1 Oct. 5, 2006

(30) Foreign Application Priority Data
Mar. 30, 2005 (JP) ............................. 2005-98886

(51) Int. Cl.
*F01N 3/00* (2006.01)
(52) U.S. Cl. .................... 60/295; 60/285; 60/297; 60/311
(58) Field of Classification Search ............ 60/285, 60/295, 297, 311; 180/65.1–65.4
See application file for complete search history.

(56) References Cited

U.S. PATENT DOCUMENTS

| | | | |
|---|---|---|---|
| 5,327,992 A * | 7/1994 | Boll | 180/65.2 |
| 6,427,793 B1 | 8/2002 | Hanada et al. | |
| 6,672,050 B2 * | 1/2004 | Murata et al. | 60/297 |
| 6,901,751 B2 * | 6/2005 | Bunting et al. | 60/297 |
| 7,104,049 B2 * | 9/2006 | Hiranuma et al. | 60/295 |

FOREIGN PATENT DOCUMENTS

| | | | |
|---|---|---|---|
| JP | 10-110613 | * | 4/1998 |
| JP | 2001-115869 | | 4/2001 |
| JP | 2005036659 | | 2/2005 |

* cited by examiner

*Primary Examiner*—Thomas E Denion
*Assistant Examiner*—Diem Tran
(74) *Attorney, Agent, or Firm*—Jacobson Holman PLLC

(57) ABSTRACT

A motor control apparatus for a hybrid vehicle with a diesel engine provides for a reduced compulsory regeneration time period so as to achieve enhancement of the fuel cost. The motor control apparatus includes a filter for collecting particulate matter in exhaust gas of the diesel engine, a compulsory regenerator for compulsorily regenerating the filter, and a battery charger for converting the output power of the diesel engine into electric power based on a charged state of the battery, and for charging the battery with the electric power. When the compulsory regeneration is executed, the supply of electric power to the battery by the engine is inhibited.

22 Claims, 4 Drawing Sheets ered by a hybrid vehicle is reduced
MOTOR CONTROL APPARATUS FOR A HYBRID VEHICLE

BACKGROUND OF THE INVENTION (1) Field of the Invention

This invention relates to a motor control apparatus for a hybrid vehicle, and more particularly to control of a motor upon compulsory regeneration of a filter which collects fine particles in exhaust gas.

(2) Description of the Related Art

Conventionally, a hybrid vehicle or a hybrid electric automobile wherein an internal combustion engine (engine) and an electric motor (motor) are used in combination to obtain driving force for the vehicle has been developed and placed into practical use. As hybrid vehicles of the type described, a series hybrid vehicle wherein an engine is used exclusively for an electric power supplying source (generator) for a motor and a parallel hybrid vehicle wherein an output power shaft of an engine and an output power shaft of a motor are mechanically connected to each other such that a driving wheel is driven by driving force of both of the engine and the motor are known.

In the parallel hybrid vehicle, a driving toque requirement is determined from load information such as an operation amount of the accelerator pedal by the driver and the speed of rotation of the engine, and the output power distribution between the engine and the motor is set from the remaining capacity (charging rate) of the battery.

Incidentally, it is a possible idea to apply a diesel engine as the engine for a parallel hybrid vehicle. In particular, a technique is know wherein an oxidation catalyst (DOC) and a filter for particulate collection are interposed in an exhaust path of a diesel engine such that PM (Particulate Matter) included in the exhaust gas is collected by the filter and the PM collected by the filter is oxidized (burned) to continuously regenerate the filter. It is to be noted that, in the following description, the PM is used in the same meaning as soot.

In such a technique as described above, for example, a pressure difference sensor is provided for detecting the pressure difference between the entrance and the exit of the filter, and if the pressure difference detected by the pressure difference sensor becomes equal to or higher than a predetermined value, it is determined that the filter suffers from clogging, and compulsory regeneration of the filter is executed.

Upon such compulsory regeneration, additional fuel injection (post fuel injection) is performed at a later stage of the expansion stroke or at an initial stage of the exhaust stroke. Thus, from within the additional fuel, unburned fuel (HC: hydrocarbons) undergoes oxidation reaction (combustion) by an oxidation catalyst so that the temperature of exhaust gas flowing into the filter is raised by heat of the reaction then. Thus, the temperature of the exhaust gas flowing into the filter is raised so high that the PM in the filter is self ignited and burned thereby to achieve compulsory regeneration of the filter (first prior art).

It is to be noted that Japanese Patent Laid-Open No. 2001-115869 (hereinafter referred to as Patent Document 1) discloses a technique wherein, in a hybrid automobile which has an ordinary traveling mode in which the automobile travels while changeover between traveling by an engine and traveling by a motor is performed suitably and a special traveling mode in which the automobile travels while being driven only by the engine, when the catalyst is not in an activated state, the traveling mode of the automobile is compulsorily changed over to the special traveling mode. By the control described, when the temperature of the catalyst is low, the catalyst temperature can be raised rapidly (second prior art).

Incidentally, in the parallel hybrid vehicle, when the remaining capacity of the battery becomes low, the motor is sometimes driven by the engine so that it acts as a generator to charge the battery.

However, the first prior art described above has a subject that, if charging of the battery while the vehicle is in a stopping state (such charging is hereinafter referred to as stopping vehicle generation control or merely as generation control) and compulsory regeneration of the filer overlap with each other, then since the oxygen is consumed by the combustion of the fuel, the compulsory regeneration is not promoted and the compulsory regeneration time period is elongated, resulting in deterioration of the fuel cost. In particular, when the motor is driven by the engine and acts as a generator, the load to the engine increases and the fuel injection amount increases while the excess air ratio decreases (that is, becomes rich) and almost all of the oxygen is used for the combustion. Therefore, the oxygen concentration in the exhaust gas drops and the oxygen amount to be supplied to the filter decreases, and the combustion (oxidation) of the PM in the filter is not promoted and the compulsory regeneration time period is elongated. Then, the fuel cost is deteriorated as the compulsory regeneration time period is elongated.

Meanwhile, according to the technique disclosed in Patent Document 1 (second prior art), when the catalyst is not in an activated state, the traveling mode is compulsorily changed over to the special traveling mode in which only the engine is used for traveling of the vehicle. However, the second prior art is a technique which is applied while the vehicle is traveling, but a countermeasure for solving the subject described above which arises while the vehicle is in a stopping state is not disclosed at all.

SUMMARY OF THE INVENTION

It is an object of the present invention to provide a motor control apparatus for a hybrid vehicle by which the compulsory regeneration time period of the hybrid vehicle is reduced to achieve enhancement of the fuel cost.

In order to attain the object described above, according to the present invention, there is provided a motor control apparatus for a hybrid vehicle, comprising a diesel engine mounted on the vehicle, a motor mounted on the vehicle, a battery connected to the motor so as to be capable of supplying electric power to the motor, a filter for collecting particulate matter in exhaust gas of the diesel engine, compulsory regeneration means for compulsorily regenerating the filter, battery charging means for converting output power of the diesel engine into electric power based on a charged state of the battery and charging the battery with the electric power, and charging inhibition means for inhibiting the supply of electric power from the battery charging means to the battery when the compulsory regeneration by the compulsory regeneration means is executed.

Preferably, the motor control apparatus for a hybrid vehicle further comprises in-compulsory-regeneration assisting means for assisting the output power of the diesel engine with the motor when the vehicle is in a stopping state and the compulsory regeneration by the compulsory regeneration means is being executed and besides the charging rate of the battery is equal to or higher than a predetermined value.

Preferably, the motor control apparatus for a hybrid vehicle further comprises automatic stopping means for automatically stopping the operation of the diesel engine when a predetermined stopping condition for the diesel engine is satisfied, and automatic stopping inhibition means for inhibiting the stopping of operation of the diesel engine by the automatic stopping means when the compulsory regeneration is being executed.

Preferably, an output power shaft of the diesel engine is connected to an input power shaft of the motor through a clutch.

With the motor control apparatus for a hybrid vehicle, when the compulsory regeneration is started while the vehicle is in a stopping state, charging of the battery is inhibited. Therefore, increase of the load to the engine can be suppressed. Accordingly, such a situation that the fuel injection amount increases can be prevented, and drop of the excess air ratio is not invited and decrease of the concentration of oxygen in the exhaust gas can be prevented. Therefore, upon compulsory regeneration, a large amount of oxygen can be supplied to the filter, and reduction of the compulsory regeneration time period can be anticipated. Further, since reduction of the compulsory regeneration time period is achieved in this manner, the period of time for which post injection is to be performed is reduced, and therefore, enhancement of the fuel cost can be anticipated.

Further, where the charging rate of the battery is equal to or higher than the predetermined value, the output power of the diesel engine is assisted by the motor. Consequently, the load to the engine is further decreased, and the excess air ratio can be further raised. As a result, the oxygen concentration in the exhaust gas can be further raised and the amount of oxygen to be supplied to the filter upon compulsory regeneration can be further increased, and further reduction of the regeneration time period can be anticipated. Accordingly, further enhancement of the fuel cost can be anticipated.

Furthermore, since automatic stopping (idling stopping) of the engine is inhibited when compulsory regeneration is being executed, stopping of the engine during compulsory regeneration of the filter can be prevented with certainty.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
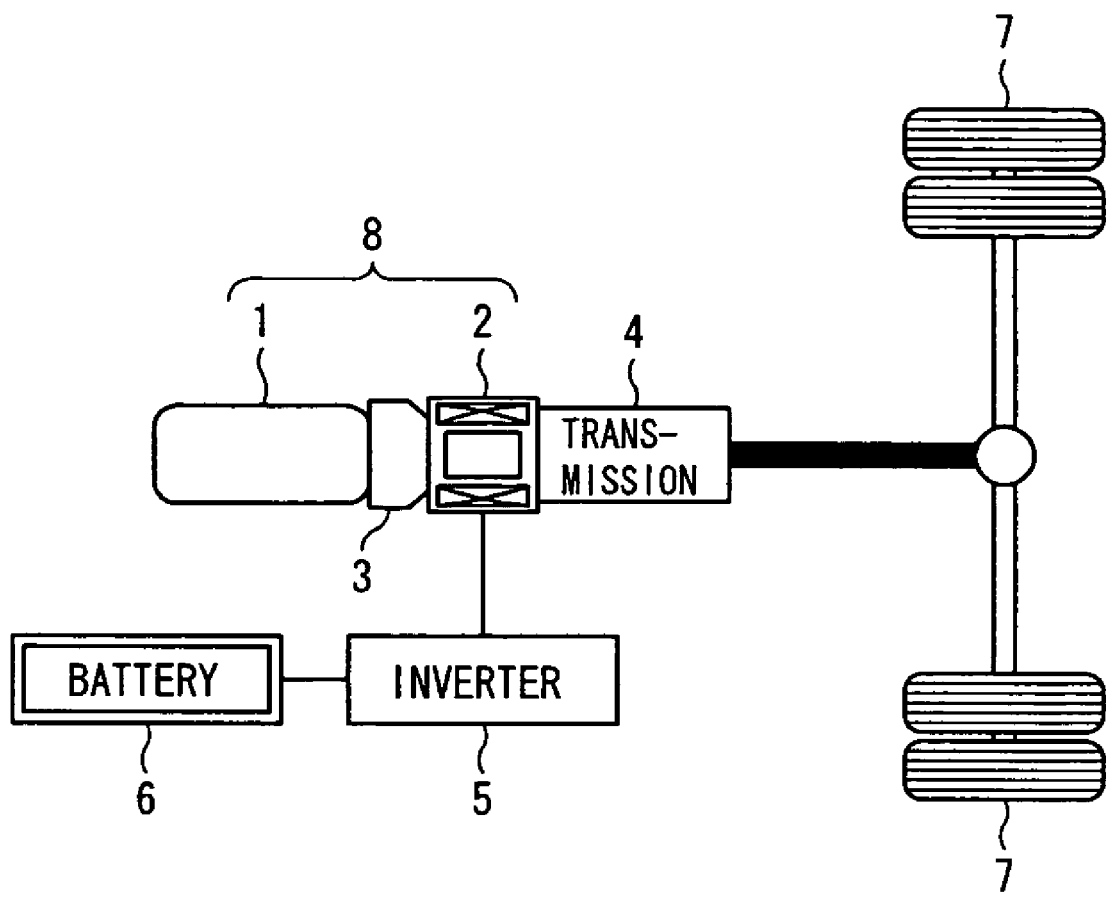
FIG. 1 is a schematic view showing a power train of a vehicle to which a motor control apparatus for a hybrid vehicle according to an embodiment of the present invention is applied.

In the following, a motor control apparatus for a hybrid vehicle according to an embodiment of the present invention is described with reference to the drawings. Referring first to FIG. 1, the vehicle shown is a parallel hybrid automobile (HEV) which uses an engine 1 and an electric motor (or motor/generator; hereinafter referred to simply as motor) 2 as a driving source 8. The vehicle is driven with total output power of the engine 1 and the motor 2.

A clutch 3 is interposed between the engine 1 and the motor 2 such that it can connect and disconnect the driving force between the engine 1 and the motor 2. A transmission 4 for changing the output rotational speed of the engine 1 and/or the motor 2 is provided on the output side of the motor 2. In short, in the vehicle, the engine 1, clutch 3, motor 2 and transmission 4 are disposed in series in this order, and the output power shaft of the engine 1 is connected to the input power shaft of the motor 2 through the clutch 3. Thus, the driving force outputted from the transmission 4 is transmitted to driving wheels 7.

A rechargeable and dischargeable battery 6 is connected to the motor 2 through an inverter 5 such that the operation condition of the motor 2 is controlled by control of operation of the inverter 5.

According to the configuration described, by connecting the clutch 3 and driving the motor 2, the vehicle can travel while the driving force of the engine 1 is assisted by the driving force of the motor 2. Further, by operating the inverter 5 so as to cause the motor 2 to function as a generator, it is possible for the motor 2 to use the driving force of the engine 1 to generate electric power to charge the battery 6 or to cause a regeneration brake corresponding to engine brake to act to regenerate the electric power. It is to be noted that also it is possible to use only the driving force of the motor 2 to drive the driving wheels 7 if the motor 2 receives supply of electric power from the battery 6 to perform power running with the clutch 3 held in a disconnected state.

Incidentally, in the present embodiment, an automatic transmission is applied as the transmission 4. The automatic transmission 4 is of the staged type wherein the gear position at present is changed over so as to coincide with a target gear position set based on a shift map. Particularly, the transmission 4 here is formed as an automatic transmission which is based on a manual transmission of the parallel biaxial gear type and changes over the gear position by rendering a plurality of actuators not shown operative.

Therefore, the transmission 4 is additionally provided with a gear shift unit (GSU) 9 (refer to FIG. 2) which has the above-mentioned actuators not shown. It is to be noted that, for the transmission, not only such a transmission as described above but also a manual transmission may be used or an automatic transmission which includes a torque converter and a planetary gear mechanism in combination may be used.

Further, the clutch 3 is an automatic clutch which is automatically connected and disconnected upon changeover of the gear position, and the connection and disconnection of the clutch 3 is executed by causing a clutch actuator not shown either to operate in cooperation with the GSU 9. It is to be noted that, where an automatic transmission having a torque converter is applied to the motor 2, the clutch 3 can be omitted.

Figure 2:
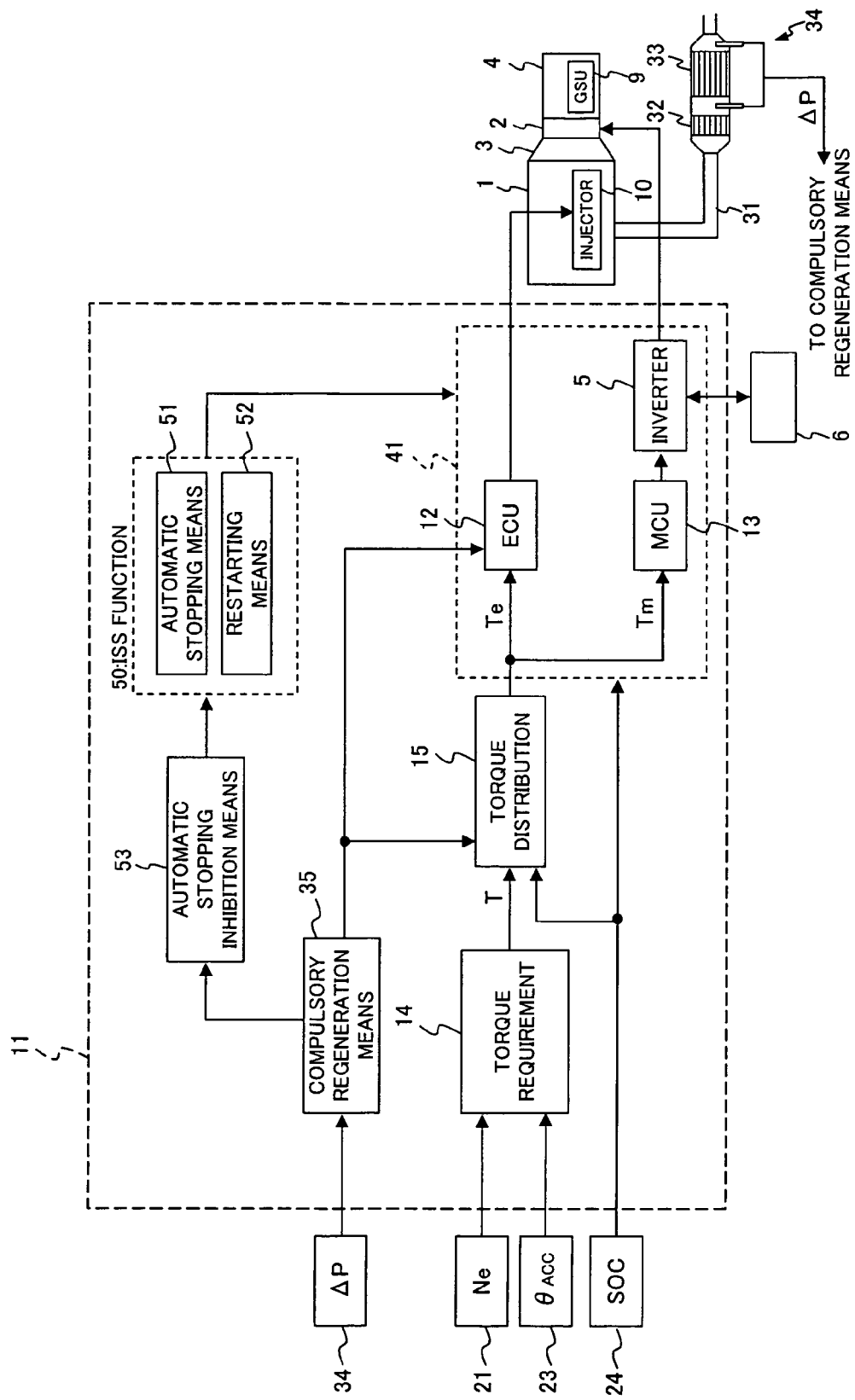
FIG. 2 is a block diagram showing principal functions of the motor control apparatus for a hybrid vehicle.

Further, in the present embodiment, the engine 1 is formed as a diesel engine, and the output torque of the engine 1 is controlled by controlling the driving period of time (that is, fuel injection amount) of an injector 10 (refer to FIG. 2).

Now, principal components of the motor control apparatus for a hybrid vehicle according to the present invention are described with reference to FIG. 2. An oxidation catalyst 32 for oxidizing components in exhaust gas and a filter 33 for collecting PM (particulate matter whose principal component is carbon C) in the exhaust gas are provided in this order from the upstream side in an exhaust path 31 of the engine 1 described above.

Upon ordinary traveling of the vehicle, the oxidation catalyst 32 oxidizes NO in the exhaust gas into $NO_2$ and supplies the $NO_2$ as an oxidizing agent to the filter 33. Then, in the filter 33, as the $NO_2$ and the PM react with each other, the PM is burned, and continuous regeneration of the filter 33 is achieved thereby.

On the other hand, upon compulsory regeneration, the oxidation catalyst 32 has a function of causing unburned fuel (HC) in the exhaust gas to undergo oxidation reaction (combustion) and supplying the exhaust gas having been heated to a high temperature by heat of the reaction then to the filter 33. Thus, by heating the exhaust gas flowed into the filter 33 to a high temperature, the PM in the filter 33 is self ignited and burned thereby to compulsorily regenerate the filter 33.

Though not particularly shown, the filter 33 is formed entirely from a porous material and has first paths and second paths disposed alternately and adjacent each other therein. The first paths are open on the upstream side and closed on the downstream side, and the second paths are closed on the upstream side and open on the downstream side. Consequently, the exhaust gas supplied to the filter 33 flows from the first paths into the second paths through wall portions of the porous material, whereupon the PM in the exhaust gas is collected by the wall portions. Further, a pressure difference sensor 34 is provided for the exhaust path 31 for detecting the pressure difference between the upstream side (entrance) and the downstream side (exit) of the filter 33.

Meanwhile, as seen in FIG. 2, the vehicle includes system management means (system management unit) 11 for generally managing and controlling the hybrid system. The pressure difference sensor 34 is connected to compulsory regeneration means 35 provided in the system management means 11. The compulsory regeneration means 35 decides, if the pressure difference between the upstream side and the downstream side of the filter 33 is equal to or higher than a predetermined value based on information from the pressure difference sensor 34, that a predetermined amount of PM is accumulated and causes clogging of the filter 33, and executes compulsory regeneration of the filter 33.

Then, when the compulsory regeneration by the compulsory regeneration means 35 is started, a compulsory regeneration instruction is outputted from an ECU 12 hereinafter described to the injector 10, and additional fuel injection (post injection) is executed after main fuel injection. This post injection is performed, for example, in the exhaust stroke, and where the fuel is injected at such a timing as just described, the fuel comes to the oxidation catalyst 32 without being burned in a cylinder, the exhaust path and so forth and is oxidized (burned) at the oxidation catalyst 32. Consequently, the filter 33 positioned on the downstream side of the oxidation catalyst 32 is heated to a temperature at which the PM can be oxidized (600° C.) thereby to perform combustion of the PM (regeneration of the filter). The post fuel injection amount is set in response to the engine speed Ne, the load (here, main injection amount qmain), the exit temperature of the oxidation catalyst 32 and so forth.

Meanwhile, the system management means 11 includes an engine control unit (ECU) 12 for controlling the output power of the engine and a motor control unit (MCU) 13 for controlling the operation condition of the inverter 5 to control the output power of the motor. Further, though not shown, the system management means 11 includes a transmission controller for setting a target gear position of the transmission 4 and controlling operation of the GSU 9 and a clutch controller for cooperating with the transmission controller to control the connection and disconnection condition of the clutch 3.

Further, the system management means 11 includes torque requirement calculation means 14 for calculating a torque requirement for the driving source 8 based on a traveling situation of the vehicle and a driving operation situation of the driver, and output distribution determination means 15 for setting an output torque to be taken charge of by the engine 1 (output distribution of the engine) and an output torque to be taken charge of by the motor 2 (output distribution of the motor) from within the torque requirement for the driving source 8 calculated by the torque requirement calculation means 14.

In addition to the pressure difference sensor 34 described hereinabove, an engine speed sensor 21 for detecting the engine speed Ne of the engine 1, an accelerator opening sensor 23 for detecting the accelerator operation amount (accelerator opening) $\theta_{ACC}$ by the driver, and a remaining capacity sensor 24 for detecting the remaining capacity (charging rate) SOC of the battery 6 are connected to the system management means 11.

As seen in FIG. 2, the engine speed Ne and the accelerator opening $\theta_{ACC}$ detected by the engine speed sensor 21 and the accelerator opening sensor 23, respectively, are inputted to the torque requirement calculation means 14. The torque requirement calculation means 14 calculates the torque requirement T to be requested to the driving source 8, which is composed of the engine 1 and the motor 2, by the driver based on the received information (Ne and $\theta_{ACC}$).

The remaining capacity sensor 24 which calculates the remaining capacity SOC of the battery 6 based on the battery voltage and the battery current is connected to the output distribution determination means 15. The output distribution determination means 15 includes an output distribution setting map (not shown) for setting an output distribution between the engine 1 and the motor 2 using the battery remaining capacity SOC obtained by the remaining capacity sensor 24 and the torque requirement T set by the torque requirement calculation means 14 as parameters. The output distribution determination means 15 sets an output distribution (torque distribution or ratio) between the engine 1 and the motor 2. It is to be noted that the output distribution setting map is set to such a characteristic that the output distribution of the engine increases basically as the remaining capacity SOC of the battery 6 decreases.

After the output distribution is set in this manner, the output distribution determination means 15 sets a target torque Te of the engine 1 and a target torque Tm of the motor 2 based on the torque requirement T for the driving source 8 calculated by the torque requirement calculation means 14 and the output distribution described above.

After the engine target torque Te and the motor target torque Tm are set in such a manner as described above, the engine target torque Te is inputted to the ECU 12, and the ECU 12 sets (or calculates) an injector driving time period for outputting the engine target torque Te. Consequently, the injector 10 is driven for the injector driving time period set by the ECU 12, and the engine 1 is controlled so that the engine output torque becomes equal to the engine target torque Te.

Further, after the motor target torque Tm is set, this is inputted to the MCU 13, by which the operation of the inverter 5 is controlled so that the motor target torque Tm may be obtained. Then, the motor 2 is controlled so that the motor output torque becomes equal to the motor target torque Tm.

While the foregoing description relates to a case wherein the motor 2 functions as a driving source, if the remaining capacity SOC of the battery 6 decreases to a level equal to or lower than a first predetermined value (for example, 33%), then the motor 2 now functions as a generator to charge the battery 6.

In particular, as seen in FIG. 2, information obtained by the remaining capacity sensor 24 is inputted not only to the output distribution determination means 15 but also to battery charging means 41 which is formed from the ECU 12, MCU 13 and inverter 5. The battery charging means 41 executes control (hereinafter referred to as generation control) of causing the engine 1 to drive the motor 2 to charge the battery 6 if both of conditions ① and ② given below are satisfied:

① that the remaining capacity SOC detected by the remaining capacity sensor 24 is equal to or lower than the first predetermined value described hereinabove; and ② that the vehicle is in a stopping state (vehicle speed=0).

In the following description, where both of the two conditions are satisfied, this is represented that the charging starting condition is satisfied. Then, if the charging starting condition is satisfied, then the transmission 4 is held at its neutral position and the clutch 3 is held at its connecting state by a transmission controller and a clutching controller (both not shown), respectively. Then, the ECU 12 controls the operation condition of the engine 1 to an operation condition suitable for generation, and the MCU 13 controls the inverter 5 so that the motor 2 functions as a generator.

Consequently, when the engine 1 operates, the driving force of the engine 1 is transmitted to the motor 2 (generator) through the clutch 3, and electric power generated by the motor 2 at this time is charged into the battery 6. It is to be noted that, in this instance, since the transmission 4 is at the neutral position, the driving force is not transmitted to the vehicle.

On the other hand, if any one of the following conditions ③ to ⑤ is satisfied, then the generation control described above is ended or stopped:

③ that the remaining capacity SOC of the battery 6 increases to a value equal to or higher than a second predetermined value (for example, 35%);

④ that the transmission 4 is shifted to a traveling gear position; or

⑤ that a vehicle speed is detected.

In the following description, where any one of the conditions ③ to ⑤ is satisfied, this is represented that the charging ending condition is satisfied. Further, if, from among the conditions described above, the remaining capacity SOC of the battery 6 increases to a value equal to or higher than the second predetermined value, then it is decided that the remaining capacity of the battery 6 is recovered sufficiently by the generation by the motor 2, and the generation control is ended. However, when the transmission 4 is shifted to a traveling gear position or when a vehicle speed is detected, the precondition for generation control (that is, that the vehicle is in a stopping state) is not satisfied, and therefore, the generation control is stopped.

Incidentally, the system management means 11 of the present apparatus includes charging inhibition means for inhibiting charging of the battery 6 by the battery charging means 41. In particular, even if the charging starting condition is satisfied, if it is decided that the filter 33 described above is in a compulsory regeneration state, then the generation control is inhibited.

This arises from the following reason. In particular, if the motor 2 is driven by the engine 1 so as to act as a generator while the vehicle is in a stopping state, then since the load to the engine 1 increases by an amount for the driving of the motor 2 (generator), the fuel injection amount increases as much. As the fuel injection amount increases, the air fuel ratio decreases (that is, the excess air ratio decreases, that is, becomes rich), and therefore, also the oxygen concentration in the exhaust gas decreases and the amount of oxygen to be supplied to the filter 33 decreases.

Here, the regeneration time period upon compulsory regeneration of the filter varies depending upon the amount of oxygen supplied to the filter 33. In particular, if the oxygen supply amount is not sufficient, then the combustion (oxidation) of the PM in the filter 33 is not promoted and the compulsory regeneration time period is elongated, but if the oxygen supply amount is sufficient, then the combustion of the PM proceeds quickly and the compulsory regeneration time period decreases.

Further, upon compulsory regeneration, since post injection is performed after main injection as described hereinabove, the amount of fuel consumption is greater than that in a normal operation situation of the vehicle. Therefore, as the compulsory regeneration time period increases, the fuel cost deteriorates.

Accordingly, if the generation control and the compulsory regeneration of the filter 33 are executed simultaneously, then the amount of oxygen to be supplied to the filter 33 decreases, and this increases the compulsory regeneration time period. As a result, the time period for the post injection increases and the fuel cost deteriorates.

Therefore, in the present apparatus, if the filter 33 is being compulsorily regenerated, then even if the charging starting condition is satisfied, the generation control is inhibited. It is to be noted that the charging inhibition means in the present embodiment is provided by a function of the battery charging means 41.

Then, where the generation control is inhibited upon compulsory regeneration of the filter 33 in this manner, the load to the engine 1 can be reduced, and the fuel injection amount can be reduced as much and the excess oxygen ratio can be increased (can be made leaner). Consequently, the oxygen concentration in the exhaust gas can be raised, and therefore, the amount of oxygen to be supplied to the filter 33 increases and decrease of the compulsory regeneration time period of the filter 33 can be achieved. Accordingly, there is an advantage that the period of time for which post injection is performed is reduced and the fuel cost is enhanced.

Incidentally, the system management means 11 further includes in-compulsory-regeneration assisting means for driving the motor 2 to assist the output power of the engine 1 when all of the following conditions ⑥ to ⑧ are satisfied. It is to be noted that, in the present embodiment, also the in-compulsory-regeneration assisting means is achieved by a function of the battery charging means 41.

⑥ That the vehicles is in a stopping state;

⑦ that compulsory regeneration is being executed; and

⑧ that the remaining capacity SOC of the battery 6 is equal to or higher than a third predetermined value (for example, 63%).

It is to be noted that, in the following description, that all of the conditions are satisfied is represented that the compulsory regeneration assisting condition is satisfied. Then, when such a compulsory regeneration assisting condition as just described is satisfied, the motor 2 is driven to assist the operation of the engine 1. Consequently, the load to the engine 1 further decreases and the fuel injection amount further decreases, and as a result, the excess air ratio can be further increased thereby to achieve further reduction of the compulsory regeneration time period of the filter 33.

It is to be noted that the third predetermined value preferably is a remaining capacity SOC with which the battery 6 is near to a fully charged state. Where such a remaining capacity SOC as just mentioned is applied, even if the motor 2 is driven in order to assist the engine 1, significant decrease of the remaining capacity SOC is not invited.

Incidentally, the hybrid vehicle according to the present embodiment has an idle stop start (ISS) function of automatically stopping the operation of the engine 1 when a predetermined engine stopping condition is satisfied and then restarting the engine 1 when a predetermined engine restarting condition different from the predetermined engine stopping condition is satisfied. It is to be noted that a vehicle which has such an ISS function as just described is hereinafter referred to as ISS vehicle.

To this end, the system management means 11 includes, as shown in FIG. 2, an ISS function section 50 having automatic stopping means 51 for automatically stopping operation of the engine 1 and restarting means 52 for restarting operation of the engine 1. Further, though not shown, to the automatic stopping means 51 and the restarting means 52, a vehicle speed sensor (not shown), a gear position sensor for detecting the gear position and like sensors are connected in addition to the engine speed sensor 21 and the remaining capacity sensor 24. Thus, if the engine stopping condition is satisfied based on information from the sensors, then the automatic stopping means 51 signals an engine stopping signal to the ECU 12 to stop driving of the injector 10 thereby to automatically stop the engine 1.

Further, if the engine restarting condition is satisfied based on information from the sensors, then the restarting means 52 signals a restarting signal to the ECU 12 to render a starter motor not shown operative thereby to restart the engine 1. It is to be noted that the motor 2 may additionally has the function as the starter motor.

It is to be noted that the ISS function itself is conventionally known widely and description of the engine stopping condition and the engine restarting condition is omitted.

The present apparatus further includes automatic stopping inhibition means 53 for inhibiting stopping of operation of the engine 1 by the automatic stopping means 51 even if the engine stopping condition is satisfied. If it is decided that the compulsory regeneration of the filter 33 is being executed based on information from the compulsory regeneration means 35, then the automatic stopping inhibition means 53 inhibits stopping of the operation of the engine 1 by the automatic stopping means 51 so that the operation of the engine 1 is continued even if the stopping condition of the engine 1 is satisfied.

This is because, upon compulsory regeneration of the filter 33, post fuel injection is performed after main fuel injection such that unburned fuel of the post fuel injection is caused to undergo oxidation reaction (combustion) by the oxidation catalyst 32 and the PM in the filter 33 is burned by heat generated by the reaction thereby to regenerate the filter 33 and because, upon compulsory regeneration of the filter 33, it is an essential condition that the engine 1 is in an operating state.

Therefore, upon compulsory regeneration of the filter 33, even if it is decided by the automatic stopping means 51 that the stopping condition of the engine 1 is satisfied, stopping of the operation of the engine 1 is inhibited by the automatic stopping inhibition means 53.

Figure 3:
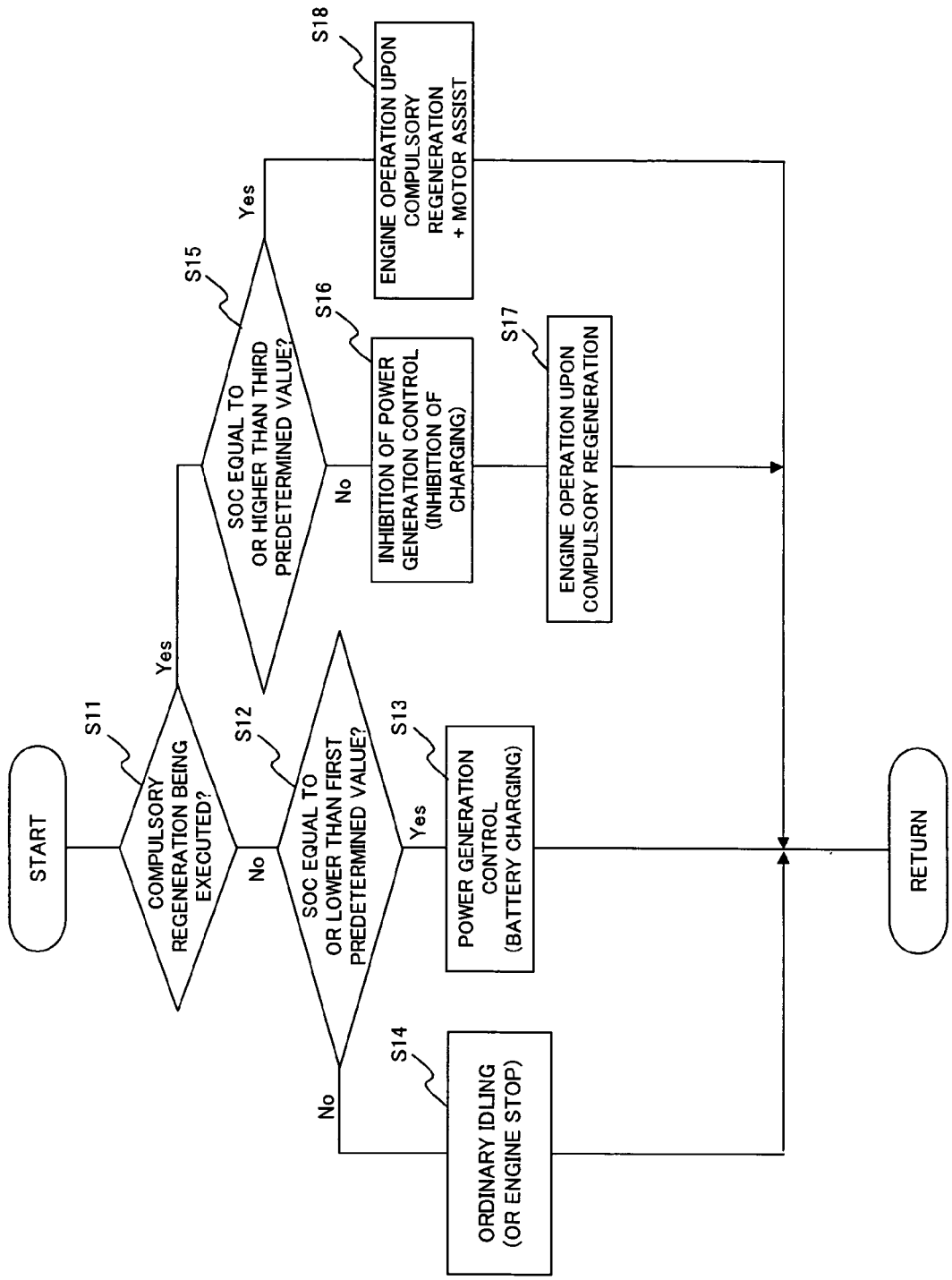
FIG. 3 is a flow chart illustrating action of the motor control apparatus for a hybrid vehicle.

Since the motor control apparatus for a hybrid vehicle according to the embodiment of the present invention is configured in such a manner as described above, it acts in such a manner as illustrated in a flow chart of FIG. 3.

The processing of the flow chart is started in response to stopping of the vehicle when the stopping of the vehicle is detected. Referring to FIG. 3, when the vehicle stops, it is decided whether or not the state of the filter 33 is such that compulsory regeneration is being executed (step S11). If it is decided that compulsory regeneration is not being executed, then the remaining capacity SOC of the battery is detected, and it is decided whether or not the remaining capacity SOC is equal to or lower than the first predetermined value (for example, 33%) (step S12).

Then, if the remaining capacity SOC is equal to or lower than the first predetermined value, then the generation control is executed (step S13). In particular, in this instance, since charging of the battery 6 takes precedence to enhancement of the fuel cost, the motor 2 is driven by the engine 1 so that the motor 2 acts as a generator. Consequently, the driving force of the engine 1 is converted into electric power which is accumulated into the battery 6.

On the other hand, if the remaining capacity SOC is higher than the first predetermined value, then ordinary idling operation is performed (step S14). At this time, if the engine stopping condition is satisfied, then the engine 1 is stopped automatically by the ISS function.

On the other hand, if it is decided at step S11 that compulsory regeneration is being executed, then it is decided whether or not the remaining capacity SOC is equal to or higher than the third predetermined value (for example, 65%) (step S15). Then, if the remaining capacity SOC is lower than the third predetermined value, then the generation control is inhibited thereby to inhibit the charging of the battery 6 (step S16). Then, the engine 1 is operated in an operation condition suitable for the compulsory regeneration such as post injection (step S17).

Accordingly, in this instance, since the generation control is inhibited upon compulsory regeneration of the filter 33, the load to the engine 1 can be reduced and the fuel injection amount can be reduced. As a result, the excess oxygen ratio can be increased and the concentration of oxygen in the exhaust gas can be raised, and the amount of oxygen to be supplied to the filter 33 increases and reduction of the regeneration time of the filter 33 can be achieved.

On the other hand, if the remaining capacity SOC is equal to or higher than the third predetermined value, then the motor 2 is driven to assist the operation of the engine 1 (step S18). In particular, this is a case wherein, during stopping of the vehicle, that is, during compulsory regeneration of the filter 33, the compulsory regeneration assisting condition that the remaining capacity SOC is equal to or higher than the third predetermined value is satisfied. At this time, since the motor 2 is driven to assist the operation of the engine 1, the driving load to the engine 1 can be further reduced thereby to reduce the fuel injection amount. Consequently, the excess air ratio further increases and the compulsory regeneration time period of the filter 33 is decreased significantly.

As described in detail above, with the motor control apparatus for a hybrid vehicle according to the present embodiment, if the vehicle is in a stopping state and compulsory regeneration is being executed and besides the remaining capacity SOC is lower than the third predetermined value, then the generation control is inhibited. Therefore, the load to the engine 1 can be reduced to increase the excess air ratio, and there is an advantage that the compulsory regeneration time period of the filter 33 is reduced and the fuel cost is enhanced.

On the other hand, if the remaining capacity SOC is equal to or higher than the third predetermined value, then the load to the engine 1 can be reduced further thereby to further increase the excess air ratio by driving the motor 2 to assist the operation of the engine 1. Accordingly, there is an advantage that the compulsory regeneration time period of the filter 33 can be further reduced and the fuel cost can be further enhanced.

Further, upon compulsory regeneration of the filter 33, since the stopping of operation of the engine 1 is inhibited by the automatic stopping inhibition means 53, there is an advantage that such a situation that the engine 1 is placed into a stopping state during compulsory regeneration of the filter 33 can be prevented with a high degree of certainty.

Figure 4:
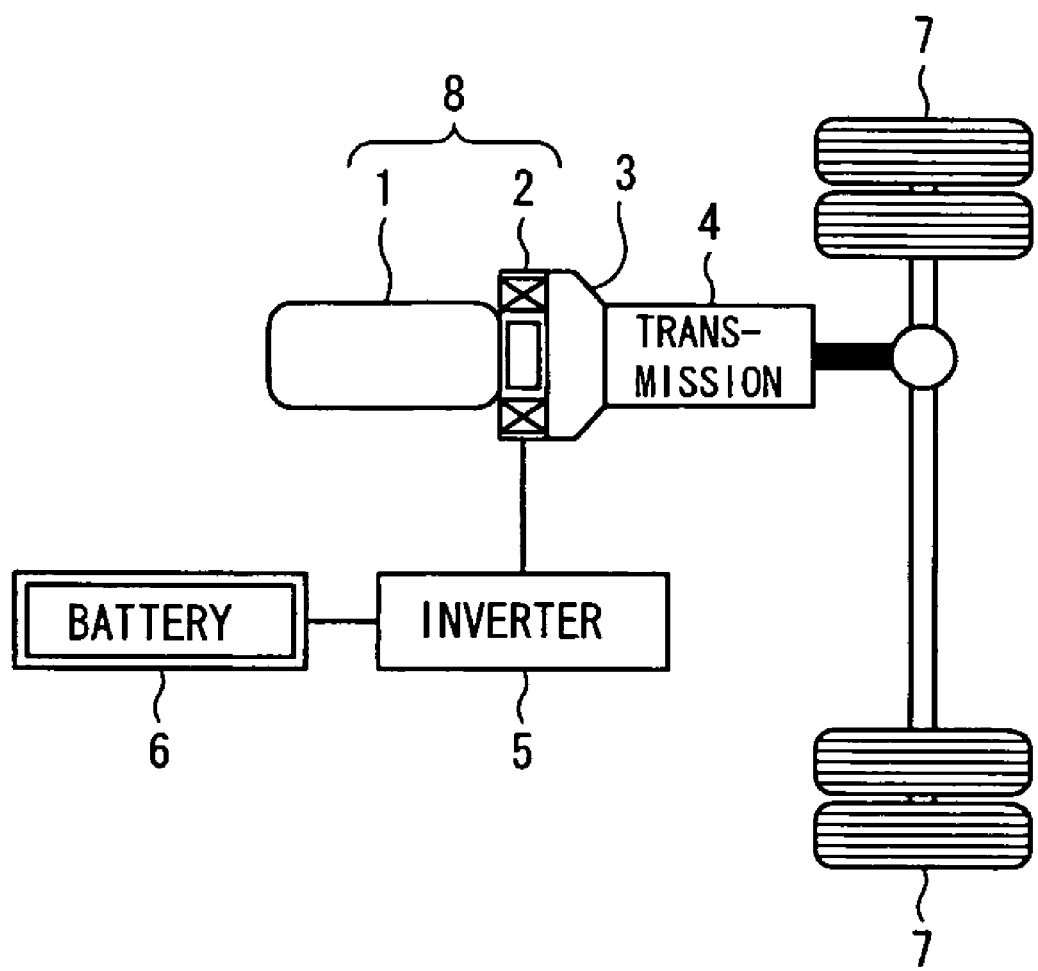
FIG. 4 is a schematic view showing a modification to the motor control apparatus for a hybrid vehicle.

While a preferred embodiment of the present invention has been described above, the present invention is not limited to the embodiment described above but various variations and modifications can be made without departing from the scope of the present invention. For example, the present invention may be applied to such a hybrid automobile as shown in FIG. 4 wherein an engine 1 and a motor 2 are provided adjacent each other and a clutch 3 is interposed between the motor 2 and the transmission 4.

What is claimed is:

1. A motor control apparatus for a hybrid vehicle, comprising:
    a diesel engine mounted on said vehicle;
    a motor mounted on said vehicle;
    a battery connected to said motor so as to be capable of supplying electric power to said motor;
    a filter for collecting particulate matter in exhaust gas of said diesel engine;
    compulsory regeneration means for compulsorily regenerating said filter;
    battery charging means for converting output power of said diesel engine into electric power based on a charged state of said battery and charging said battery with the electric power; and
    charging inhibition means for inhibiting the supply of said electric power from said battery charging means to said battery when the compulsory regeneration by said compulsory regeneration means is executed, said charging inhibition means interrupting the supply of said electric power from said battery charging means to said battery when a compulsory regeneration starting condition is satisfied at stopping the vehicle even if said battery charging is being executed.

2. The motor control apparatus for a hybrid vehicle as claimed in claim 1, further comprising
    automatic stopping means for automatically stopping the operation of said diesel engine when a predetermined stopping condition for said diesel engine is satisfied, and
    automatic stopping inhibition means for inhibiting the stopping of operation of said diesel engine by said automatic stopping means when the compulsory regeneration is being executed.

3. The motor control apparatus for a hybrid vehicle as claimed in claim 1, wherein said diesel engine has an output power shaft and said motor has an input power shaft, and said engine output power shaft is connected to said motor input power shaft through a clutch.

4. The motor control apparatus according to claim 1, further comprising a sensor for detecting a pressure difference across said filter, and wherein said regeneration means is configured to effect said regeneration based on said detected pressure drop.

5. The motor control apparatus for a hybrid vehicle as claimed in claim 1, further comprising in-compulsory-regeneration assisting means for assisting the output power of said diesel engine with said motor when said vehicle is in a stopping state and the compulsory regeneration by said compulsory regeneration means is being executed, and a charging rate of said battery is equal to or higher than a predetermined value.

6. The motor control apparatus for a hybrid vehicle as claimed in claim 5, wherein said diesel engine has an output power shaft and said motor has an input power shaft, and said engine output power shaft is connected to said motor input power shaft through a clutch.

7. The motor control apparatus according to claim 1, wherein said regeneration means includes an oxidation catalyst configured to oxidize components in said exhaust gas, said catalyst being located in an exhaust gas path between said engine and said filter.

8. The motor control apparatus according to claim 7, wherein said regeneration means is configured to effect a continuous filter regeneration by supplying an oxidized component to said filter as an oxidizing agent for reacting with and burning said collected particulate matter.

9. The motor control apparatus according to claim 7, wherein said regeneration means is configured to effect a compulsory filter regeneration by oxidizing an excess of unburned fuel in said exhaust gas so as to heat said exhaust gas, supplying said heated exhaust gas to said filter, and igniting said collected particulate matter.

10. The motor control apparatus according to claim 1, further comprising an automatic engine stop device configured to automatically stop operation of said diesel engine based on a predetermined stopping condition.

11. The motor control apparatus according to claim 10, further comprising an automatic engine stop inhibitor configured to prevent said engine from stopping during said compulsory filter regeneration.

12. A motor control apparatus for a hybrid vehicle, comprising:
    a diesel engine mounted on said vehicle;
    an electric motor, which is mechanically connected to said engine, mounted on said vehicle;
    a battery electrically connected to said electric motor;
    a filter for collecting particulate matter in exhaust gas from said diesel engine;
    compulsory regeneration means for compulsorily regenerating said filter when a compulsory regeneration starting condition is satisfied;
    battery charging means for charging said battery with electric power generated from said electric motor driven by said diesel engine according to a charged state of said battery; and
    charging inhibition means for inhibiting the charging of said battery by said battery charging means when the compulsory regeneration is in progress by said compulsory regeneration means,
    said charging inhibition means interrupting the charging of said battery by said battery charging means when the compulsory regeneration starting condition is satisfied even if said battery charging is in progress by said battery charging means.

13. The motor control apparatus for a hybrid vehicle as claimed in claim 12, further comprising
    automatic stopping means for automatically stopping the operation of said diesel engine when a predetermined stopping condition for said diesel engine is satisfied, and
    automatic stopping inhibition means for inhibiting the stopping of operation of said diesel engine by said automatic stopping means when the compulsory regeneration is being executed.

14. The motor control apparatus for a hybrid vehicle as claimed in claim 12, wherein said diesel engine has an output power shaft and said motor has an input power shaft, and said engine output power shaft is connected to said motor input power shaft through a clutch.

15. The motor control apparatus according to claim 12, further comprising a sensor for detecting a pressure difference across said filter, and wherein said regeneration means is configured to effect said regeneration based on said detected pressure drop.

16. The motor control apparatus for a hybrid vehicle as claimed in claim 12, further comprising in-compulsory-regeneration assisting means for assisting the output power of said diesel engine with said motor when said vehicle is in a stopping state and the compulsory regeneration by said compulsory regeneration means is being executed, and a charging rate of said battery is equal to or higher than a predetermined value.

17. The motor control apparatus for a hybrid vehicle as claimed in claim 16, wherein said diesel engine has an output power shaft and said motor has an input power shaft, and said engine output power shaft is connected to said motor input power shaft through a clutch.

18. The motor control apparatus according to claim 12, wherein said regeneration means includes an oxidation catalyst configured to oxidize components in said exhaust gas, said catalyst being located in an exhaust gas path between said engine and said filter.

19. The motor control apparatus according to claim 18, wherein said regeneration means is configured to effect a continuous filter regeneration by supplying an oxidized component to said filter as an oxidizing agent for reacting with and burning said collected particulate matter.

20. The motor control apparatus according to claim 18, wherein said regeneration means is configured to effect a compulsory filter regeneration by oxidizing an excess of unburned fuel in said exhaust gas so as to heat said exhaust gas, supplying said heated exhaust gas to said filter, and igniting said collected particulate matter.

21. The motor control apparatus according to claim 12, further comprising an automatic engine stop device configured to automatically stop operation of said diesel engine based on a predetermined stopping condition.

22. The motor control apparatus according to claim 21, further comprising an automatic engine stop inhibitor configured to prevent said engine from stopping during said compulsory filter regeneration.

* * * * *